United States Patent
Elliott

(10) Patent No.: US 8,972,098 B2
(45) Date of Patent: Mar. 3, 2015

(54) METHODS AND APPARATUS FOR LOST CONNECTION HANDLING

(71) Applicant: Ford Global Technologies, LLC, Dearborn, MI (US)

(72) Inventor: Doron M. Elliott, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/474,810

(22) Filed: Sep. 2, 2014

(65) Prior Publication Data

US 2014/0370815 A1 Dec. 18, 2014

Related U.S. Application Data

(62) Division of application No. 13/041,780, filed on Mar. 7, 2011, now Pat. No. 8,831,817.

(51) Int. Cl.
| | |
|---|---|
| *G01M 17/00* | (2006.01) |
| *G06F 7/00* | (2006.01) |
| *G06F 11/30* | (2006.01) |
| *G06F 19/00* | (2011.01) |
| *G07C 5/00* | (2006.01) |
| *H04W 76/02* | (2009.01) |
| *H04L 29/08* | (2006.01) |

(52) U.S. Cl.
CPC ............. *H04W 76/028* (2013.01); *H04L 67/12* (2013.01)
USPC ............ 701/29.6; 701/2; 340/5.72; 340/13.2; 455/41.1; 455/41.2; 455/423; 455/456.1; 455/456.2

(58) Field of Classification Search
USPC .......... 701/1, 2, 29.6; 455/456.1, 456.2, 41.2, 455/423, 41.1; 340/5.72, 13.2
See application file for complete search history.

(56) References Cited

U.S. PATENT DOCUMENTS

| | | | |
|---|---|---|---|
| 6,052,603 A | 4/2000 | Kinzalow et al. | |
| 6,226,529 B1 | 5/2001 | Bruno et al. | |
| 6,323,566 B1 | 11/2001 | Meier | |
| 6,992,565 B1 * | 1/2006 | Giesler | 340/5.72 |
| 7,061,368 B2 | 6/2006 | Okada | |
| 7,142,090 B2 | 11/2006 | Ueda et al. | |
| 7,239,869 B2 * | 7/2007 | Suenaga | 455/421 |

(Continued)

FOREIGN PATENT DOCUMENTS

| | | |
|---|---|---|
| EP | 1049347 | 11/2000 |
| EP | 1770900 | 4/2007 |

(Continued)

OTHER PUBLICATIONS

CN Office Action dated Feb. 20, 2013.

(Continued)

*Primary Examiner* — Rami Khatib
(74) *Attorney, Agent, or Firm* — Jennifer M. Stec; Brooks Kushman P.C.

(57) ABSTRACT

A computer-implemented method, executable by a vehicle computing system (VCS), includes determining that a connection between a wireless device and a VCS has been lost. The method further includes determining if a driver is present in the vehicle, upon a lost link detection. The method additionally includes waiting until an enter-event occurs and then attempting to re-establish a connection between the wireless device and the VCS. This last step may be conditional upon a determination that a driver is not present.

18 Claims, 5 Drawing Sheets

(56) References Cited

U.S. PATENT DOCUMENTS

| | | |
|---|---|---|
| 7,299,076 B2 | 11/2007 | Dunn, Jr. et al. |
| 7,363,061 B2 | 4/2008 | Kakehi |
| 7,395,052 B2 | 7/2008 | Mitterreiter et al. |
| 7,551,066 B1 | 6/2009 | Burger |
| 7,756,552 B2 | 7/2010 | Haikola et al. |
| 7,944,901 B2 | 5/2011 | Souissi et al. |
| 7,979,028 B2 | 7/2011 | Matsuda |
| 8,285,341 B2 | 10/2012 | Sykora et al. |
| 8,369,393 B2 | 2/2013 | Birmingham |
| 2001/0023446 A1 | 9/2001 | Balogh |
| 2002/0032048 A1 | 3/2002 | Kitao et al. |
| 2002/0128882 A1 | 9/2002 | Nakagawa et al. |
| 2003/0032460 A1 | 2/2003 | Cannon et al. |
| 2003/0114195 A1 | 6/2003 | Chitrapu et al. |
| 2003/0224805 A1* | 12/2003 | Suenaga ............... 455/456.1 |
| 2004/0039505 A1 | 2/2004 | Vollmer et al. |
| 2004/0072558 A1* | 4/2004 | Van Bosch ............... 455/417 |
| 2004/0179512 A1 | 9/2004 | LeBlanc et al. |
| 2004/0198306 A1 | 10/2004 | Singh et al. |
| 2004/0218605 A1 | 11/2004 | Gustafsson et al. |
| 2005/0070272 A1 | 3/2005 | Marangos |
| 2005/0288837 A1 | 12/2005 | Wiegand et al. |
| 2006/0109107 A1 | 5/2006 | Staton et al. |
| 2006/0116127 A1 | 6/2006 | Wilhoite et al. |
| 2006/0143097 A1 | 6/2006 | Mitterreiter et al. |
| 2006/0168627 A1 | 7/2006 | Zeinstra et al. |
| 2006/0223536 A1 | 10/2006 | Chia |
| 2006/0234769 A1 | 10/2006 | Srinivasan et al. |
| 2007/0124058 A1* | 5/2007 | Kitagawa et al. ............ 701/200 |
| 2007/0140187 A1 | 6/2007 | Rokusek et al. |
| 2008/0020707 A1 | 1/2008 | Takayama et al. |
| 2008/0200216 A1 | 8/2008 | Schwarcz |
| 2009/0049074 A1 | 2/2009 | Dara-Abrams et al. |
| 2009/0267774 A1 | 10/2009 | Enegren et al. |
| 2009/0292416 A1 | 11/2009 | Ubik et al. |
| 2009/0298474 A1 | 12/2009 | George |
| 2010/0069001 A1 | 3/2010 | Arndt et al. |
| 2010/0169432 A1 | 7/2010 | Santori, Jr. et al. |
| 2010/0210211 A1 | 8/2010 | Price |
| 2010/0210302 A1 | 8/2010 | Santori, Jr. et al. |
| 2010/0245123 A1 | 9/2010 | Prasad et al. |
| 2011/0306338 A1* | 12/2011 | Ozaki et al. .................. 455/423 |

FOREIGN PATENT DOCUMENTS

| | | |
|---|---|---|
| EP | 1188617 | 6/2008 |
| JP | 2005012563 | 1/2005 |
| JP | 2005502271 | 1/2005 |
| JP | 2005276134 | 10/2005 |
| JP | 2006523416 | 10/2006 |
| JP | 2008224862 | 10/2008 |
| WO | 9857824 | 12/1998 |
| WO | 0015931 | 3/2000 |
| WO | 03100739 | 12/2003 |

OTHER PUBLICATIONS

The Cable Guy "The Windows XP Wireless Zero Configuration Service" Microsoft TechNet, Nov. 2002.

Ricky Says, Use Your Cell Phone as a Laptop Modem (PC and Mac), http://www.ricksays.com/cell-phone-as-a-laptop-modem, pp. 1-19.

Mah, Use your Windows Mobile smartphone as a WI-FI access point, TechRepublic: A ZDNet Tech Community, Feb. 9, 2010, printed Jul. 31, 2010.

Ford Syn Feature Spotlight: WiFi and Mobile Hotspot in the Car/In Telematics Today, printed from http://?intelematicstoday.com, printed Jul. 31, 2010.

International Search Report dated Sep. 15, 2008, PCT/EP2008/056266 filed May 21, 2008.

* cited by examiner

METHODS AND APPARATUS FOR LOST CONNECTION HANDLING

CROSS-REFERENCE TO RELATED APPLICATIONS

This application is a division of U.S. application Ser. No. 13/041,780 filed Mar. 7, 2011, now U.S. Pat. No. 8,831,817 the disclosure of which is hereby incorporated in its entirety by reference herein.

TECHNICAL FIELD

The illustrative embodiments generally relate to methods and apparatuses for handling a lost connection between a wireless device and a vehicle computing system.

BACKGROUND

BLUETOOTH communication systems provide the ability to wirelessly connect a plurality of devices to each other, but a limitation on such a network is generally that it has a smaller range than more conventional wireless networks. As a result, if two devices in communication over a BLUETOOTH network, for example, a vehicle computing system and a wireless mobile device, are separated by more than a certain distance, the signal between those devices may be lost. In the preceding example, a driver stopping to get gasoline, for example, and leaving the proximity of the vehicle, may break a BLUETOOTH connection to the vehicle.

Additionally, vehicle computing systems may have no current method for handling an upcoming disconnect, since the system may not be aware that a disconnect is about to ensue until the connection is actually broken. Data transfer can thus be abruptly interrupted, or applications running in conjunction with the vehicle computing system can have their functionality interrupted.

SUMMARY

In a first illustrative embodiment, a computer-implemented method, executable by a vehicle computing system (VCS), includes determining that a connection between a wireless device and a VCS has been lost. The illustrative method further includes, upon a lost link detection, determining if a driver is present in the vehicle. The illustrative method additionally includes waiting until an enter-event occurs and then attempting to re-establish a connection between the wireless device and the VCS. This last step may be conditional upon a determination that a driver is not present.

In a second illustrative embodiment, a computer readable storage medium stores instructions that when executed by a vehicle computing system (VCS) cause the vehicle computing system to perform the method including determining that a connection between a wireless device and a VCS has been lost. The illustrative process also includes, upon a lost link detection, determining if a driver is present in the vehicle. The illustrative process further includes waiting until an enter-event occurs and then attempting to re-establish a connection between the wireless device and the VCS, conditional upon a determination that a driver is not present.

In a third illustrative embodiment, a computer-implemented method, executable by a vehicle computing system (VCS), includes detecting that a vehicle transmission is in a park state. The illustrative method also includes determining if a connectable device, not currently connected to the VCS, is present within a detection range.

The illustrative method includes detecting an exit-event and detecting a connection loss between a first connected device and the VCS. The illustrative method also include transferring a connection to the connectable device once the exit-event and the connection loss have been detected and conditional on the determination that the connectable device is present within the detection range.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
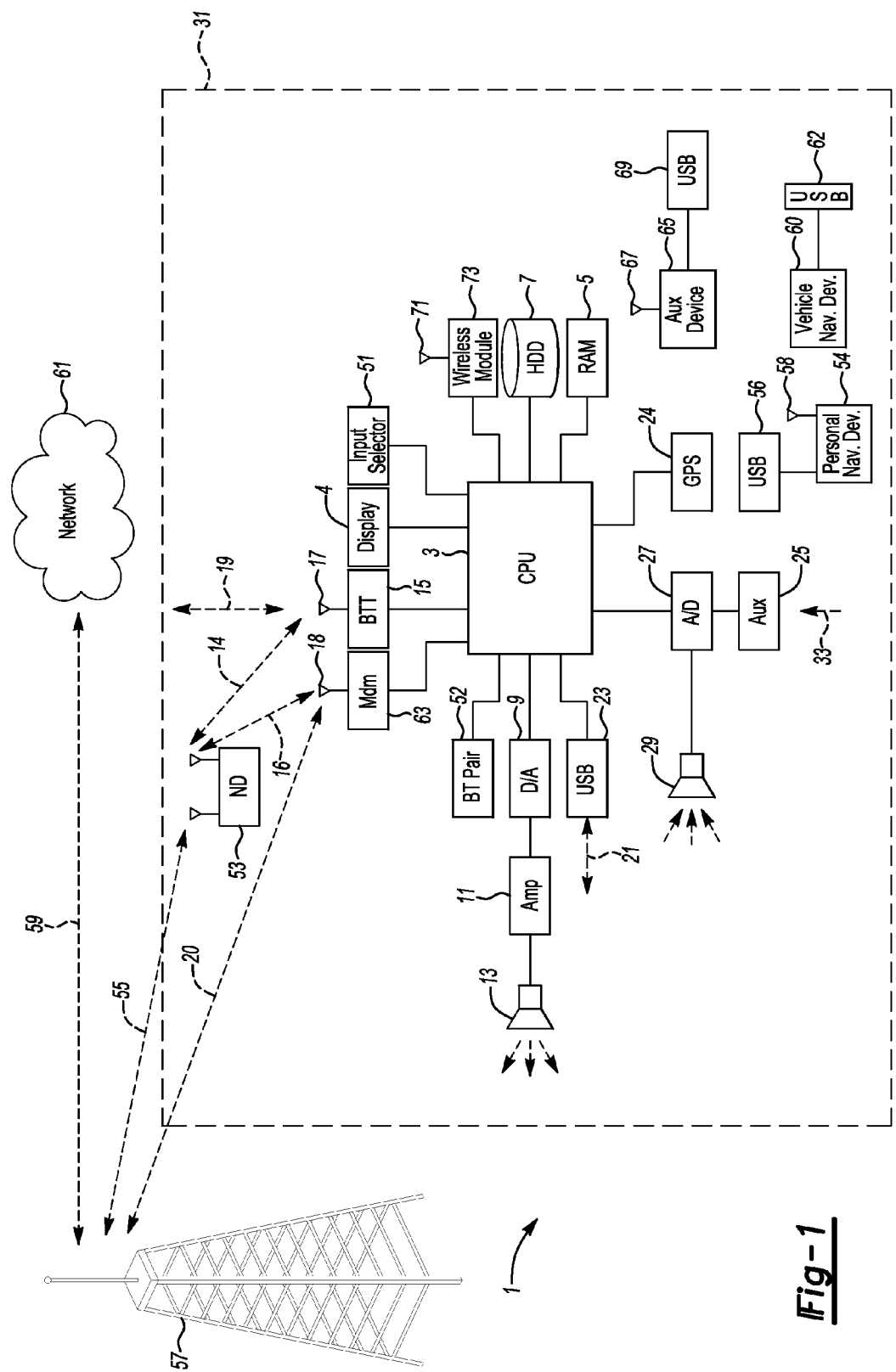
FIG. 1 shows an illustrative example of a vehicle associated computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device).

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73. Auxiliary device 65 may include, but are not limited to, personal media players, wireless health devices, portable computers, and the like.

Although the following describes the invention in terms of illustrative embodiments, these examples are provided for non-limiting illustrative purposes only, and are not intended to limit the scope of the invention thereto.

In at least one illustrative embodiment, through the use of sensors built into vehicles, it is possible for a vehicle computing system to anticipate when a connection to a wireless device may be lost, and to take steps necessary to address any issues this may cause. Further, if a link is lost, the vehicle is capable of recognizing that the device to which the connection was lost is likely not within connectable range, and thus attempts to reconnect can be suspended until the device is back within range. Additionally, if a signal is repeatedly lost due to a poorly working wireless connection, a user may instruct the vehicle to continue efforts to connect, or to alternatively try another device that may be present.

A variety of vehicle sensors may be used to "guess" that a driver or passenger is no longer present in the vehicle. Seat pressure sensors, vehicle cockpit cameras, door opening detection mechanisms, key-out detection mechanisms and other sensors all feed information into one or more vehicle networks, such as, but not limited to, the CAN bus. From these networks, a vehicle computing system can pull sensor data and determine, for example, the likelihood a driver has left the vehicle.

In certain circumstances it may be useful to be able to anticipate an upcoming link loss between a vehicle computing system and a connected wireless device. For example, if data is being transferred from a remote source, through the wireless device, to the vehicle computing system, the vehicle computing system may want to take steps to continue (using an alternative connection) or resiliently pause the data transfer, so that the entire process doesn't have to be repeated when the connection to the wireless device is re-established.

More generally, there is no reason to waste vehicle resources searching for a lost link, if the vehicle has reason to "believe" that a driver is out of range of the vehicle. In systems where a vehicle records a number of failed connect attempts (in order, for example, to establish the existence of a poorly working link), connection attempts that fail because a device is out of range should not be counted. By pausing a reconnection attempt until one or more sensors indicates a likelihood that a wireless device possessor is back within a vehicle, the system is capable of distinguishing between the two situations.

Figure 2:
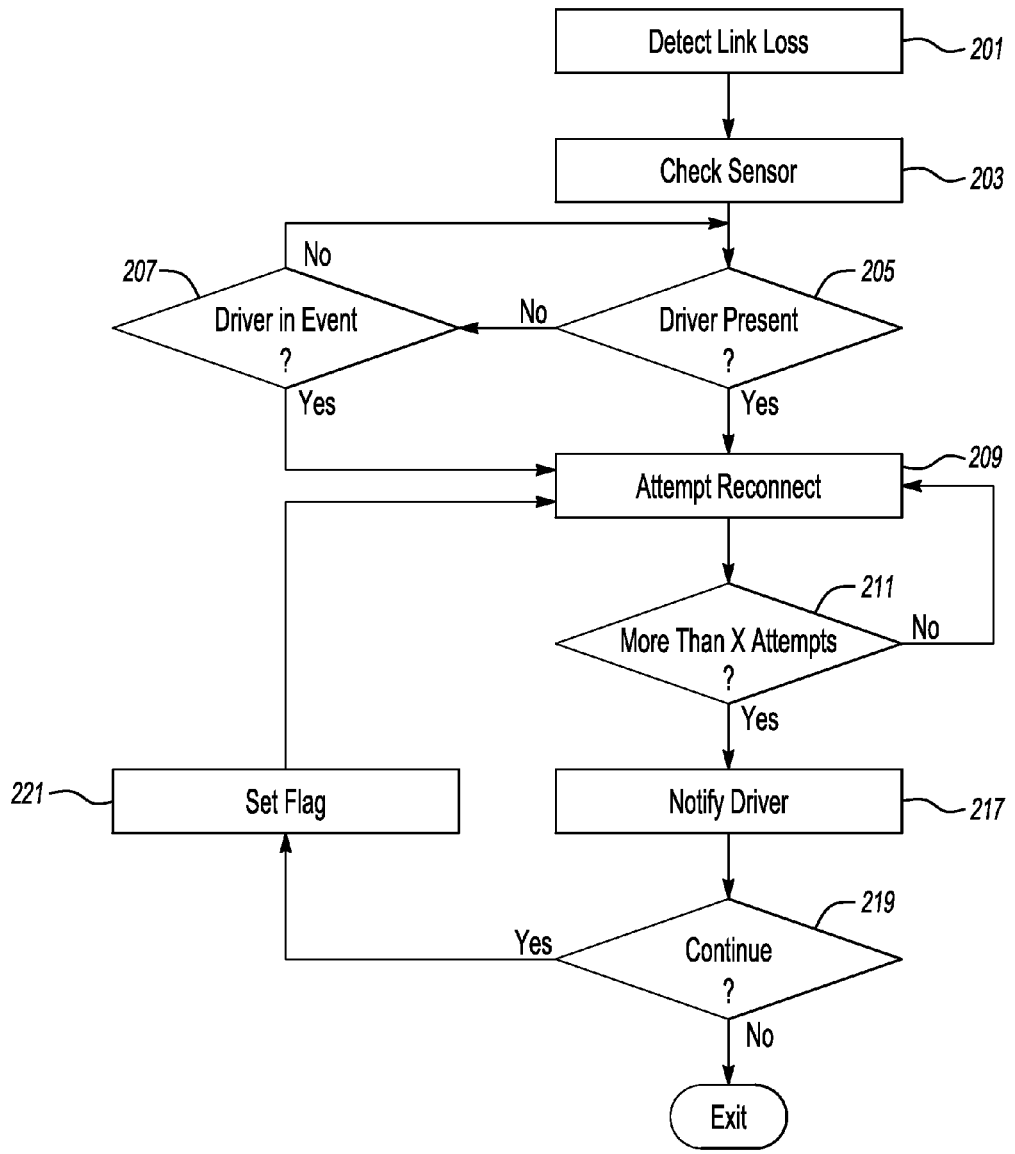
FIG. 2 shows an illustrative example of a process for link loss management triggered by a lost link.

FIG. 2 shows an illustrative example of a process for link loss management triggered by a lost link. In this illustrative embodiment, a vehicle computing system first detects a link loss and then checks one or more vehicle sensors to determine if a driver (or passenger) is likely present.

First, the system loses a connection to a connected wireless device 201. As previously noted, this is often a BLUETOOTH connection, but any suitable wireless connection may be established and lost. Once the connection is lost, the system attempts to distinguish between a faulty connection (or a powered-down device) and an unavailable connection (due, for example, to driver proximity).

In this illustrative example, the system checks one or more vehicle sensors that may tend to indicate the presence or absence of a driver. For example, a weight sensor in a driver seat may generally tend to indicate that a driver is present if weight over a certain level is sensed. Alternatively, a key-on or key-in sensor may typically indicate the presence of a driver. Also, if the vehicle is in gear or in motion, then it is hoped that a driver is present. A cockpit camera that can see the driver is another sensor that may be considered to detect the presence of a driver. Additionally, if a driver's side door is currently open, then it may be an indication that the driver is not in the vehicle.

If the driver is not determined to be present (through the use of one or more sensors, alone or in combination), then the vehicle computing system goes into a waiting state 207, until a driver-in event is sensed. The driver-in event can be sensed through use of the same sensors previously described, or through any other reasonable sensor usable for driver-exit and driver-in detection, such as, but not limited to, a door open sensor. If the door having been left in an open state was already used to detect the absence of a driver, then the system may need to use the fact that the door has been changed to a closed state as evidence of the presence of a driver. Since this could occur in other circumstances (a stranger or another passenger closes the door), the system may want to check at least one other indicator as well.

Once a suitable driver-in event has been established, or if the driver was determined never to have left the vehicle in the first place, the vehicle computing system attempts to re-connect 209 to the wireless device. If the system reaches a point where connection is still not established after a certain number of attempts 211, the system notifies the driver that a bad connection may be present 217. Since the device to which the system is attempting to connect may be the only wireless device present, and since the driver may want or need the data connection, even if spotty, the driver, in this example, is given the option to continue to attempt to connect 219.

If another device is present, or if the driver otherwise instructs the cessation of the connection attempt, the process exits. If the driver wishes the attempts to continue, a flag is set 221 so that the process doesn't harass the driver each time the attempt to connect continues to fail and the count is over a certain point.

Figure 3:
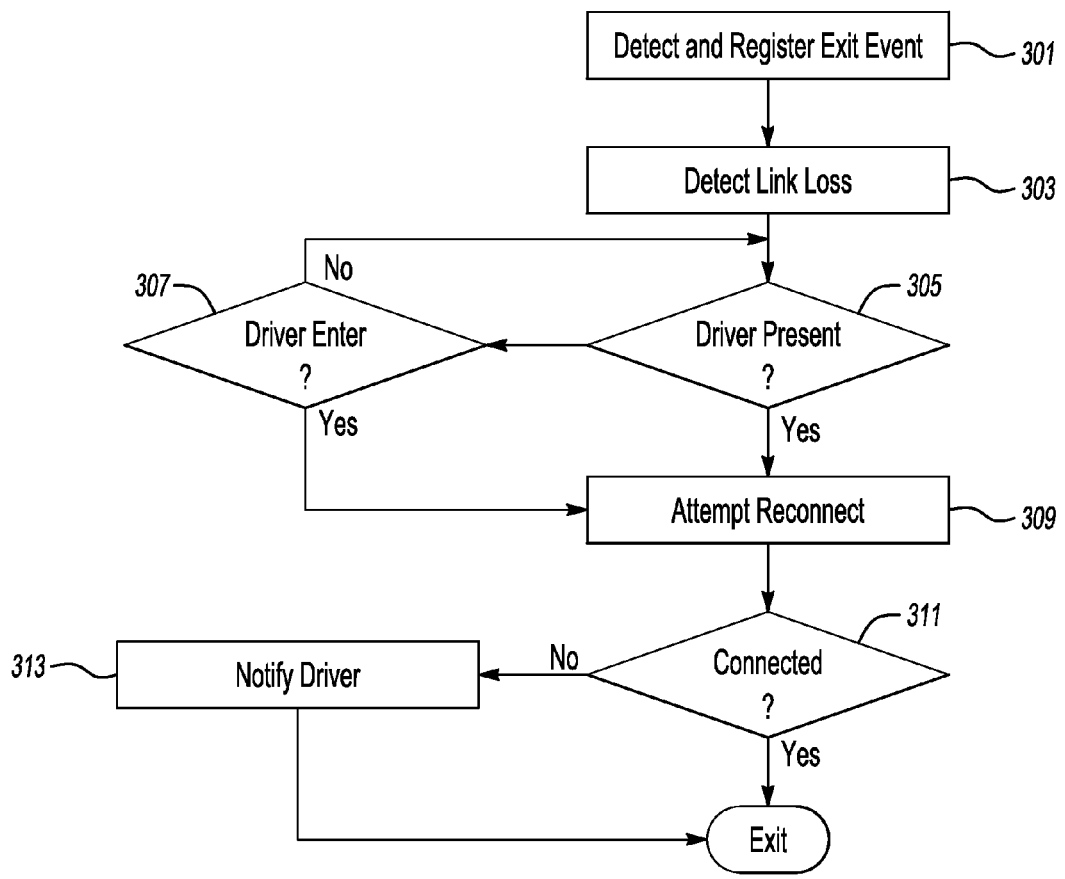
FIG. 3 shows an illustrative example of a process for link loss management triggered by a driver-exit event.

FIG. 3 shows an illustrative example of a process for link loss management triggered by a driver-exit event. In this illustrative embodiment, before detecting a link loss, the vehicle detects a driver-exit event 301. Once the event is detected, the vehicle registers the occurrence of the event for later use (if, for example, a link is lost).

As previously noted, driver exit events can be detected through a variety of vehicle sensors. The events can include the detection of a door opening, a key off/out, a lack of weight detected by a seat sensor, etc.

At some point after a driver-exit event has been detected and registered, a link loss is detected 303. In this illustrative embodiment, the system checks to see if the driver is present or not 305, which may simply be a reference to the registered state of the driver-exit event (e.g., has one occurred). If the driver is present (i.e., if the driver never left the vehicle or if a driver has reentered the vehicle 307, a reconnection attempt is made 309. In this embodiment, if the reconnection is unsuccessful, the system notifies the driver 313 and then exits. The system does not spool repeatedly, attempting to reconnect.

Further, since this exemplary process is triggered by the detection and registration of a driver-exit event, step 305 may be omitted, since it can be assumed that the event which triggered the process indicated that the driver is not present. In an alternative embodiment, step 307 can simply supplant step 305.

Figure 4:
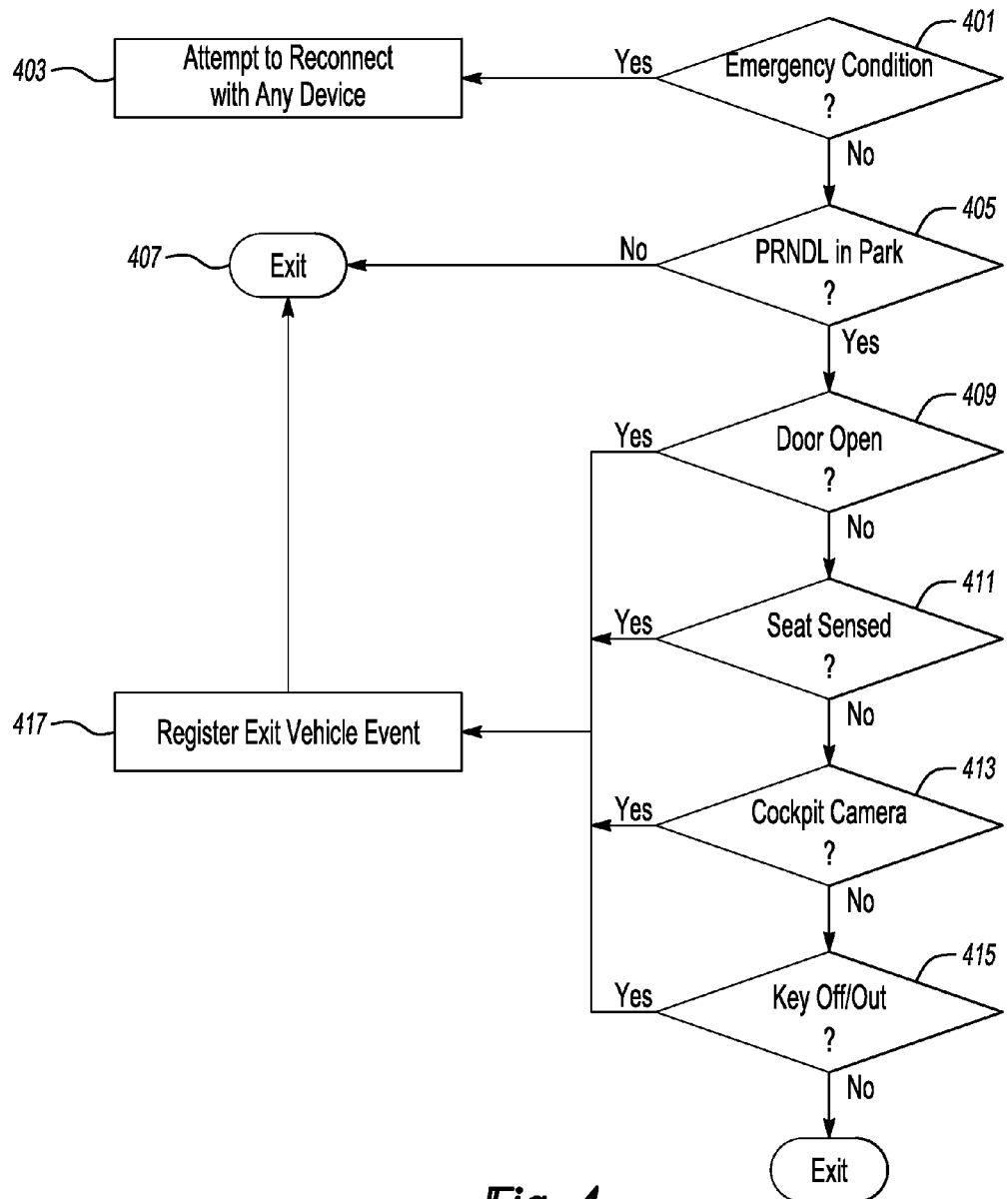
FIG. 4 shows an illustrative example of a process for determining a driver-exit event.

FIG. 4 shows an illustrative example of a process for determining a driver-exit event. In this illustrative embodiment, as a safety precaution, the vehicle computing system first checks to see if an emergency event has occurred 401. If so, a special emergency condition flag will be set, and the vehicle computing system will be prevented from pausing reconnection attempts 403. The vehicle computing system goes into a state where it attempts to connect with any available device, in order to place an emergency call.

Since at least one sensor, such as the seat weight sensor, relies on the presence of a person, then in the event a driver has been thrown from a vehicle far enough to lose a connection, and has crawled back to within connection range, it would not be beneficial to have the system pause reconnection attempts. Thus, although not necessary, it is recommended that this or a similar safety consideration be included.

If no emergency condition is present, the system then checks if the PRNDL is in park 405. As previously noted, if the vehicle is not in park, it is hoped that the driver is in the vehicle, and thus the process exits 407, since it assumes that an exit event has not occurred (at least, not under normal conditions where reconnection suspension would be a desirable course of action).

Next, in this illustrative example, the vehicle computing system checks to see if a door has been opened 409. If the check is being made for a driver, this would correspond to a check on a driver's side door. If the check was being made for a passenger, this would correspond to a check on a passenger door. If no door has opened, the system checks to see if a seat sensor (such as, but not limited to, a weight sensor) has been triggered or is off 411. Again, various seats can be checked based on who the check is being made for.

If the seat sensor still shows weight (or doesn't exist) the system may check a cockpit camera 413, a key on/off in/out status 415, or any other suitable sensor not shown, for determining driver/passenger presence/absence. If any sensor (or combination of sensors, if that is determined to be more definitive) indicates that a passenger is not present, the system registers an exit-vehicle event 417. If all sensors indicate the presence of the party for whom the detection was attempted, the system simply exits.

Figure 5:
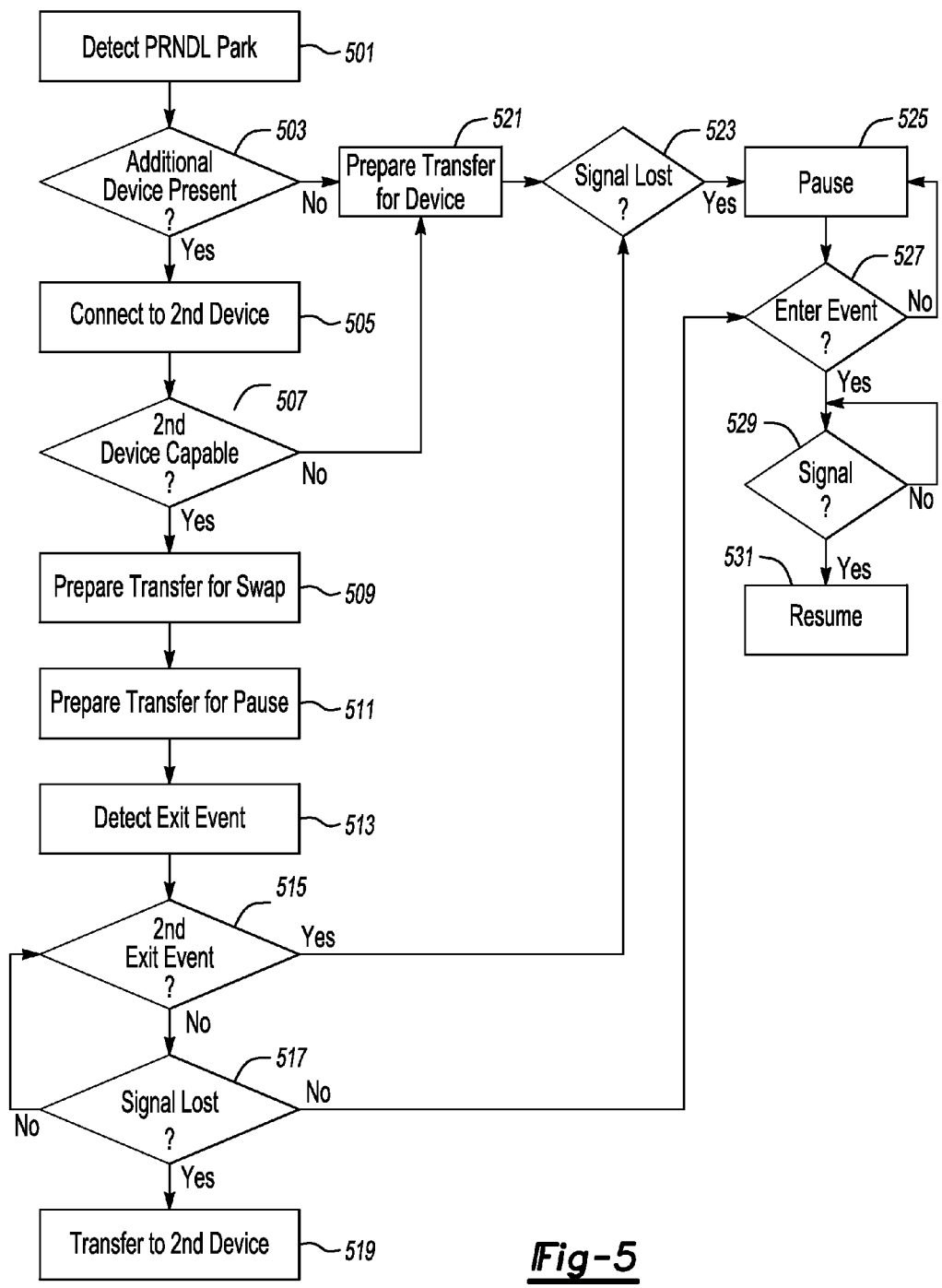
FIG. 5 shows an illustrative example of a data transfer (or usage) management process.

FIG. 5 shows an illustrative example of a data transfer (or usage) management process. In this illustrative embodiment, a vehicle associated computing system detects that a vehicle has been placed in park 501. While not definitive, this is an indication that the vehicle's power may soon be disabled. Other suitable detections may also be used.

In this illustrative embodiment, the vehicle connects to a second device if a data transfer is currently in progress and connection to the first device is lost. This allows the transfer to complete even in the absence of the first connection. If a second device is not present, the transfer will be paused until the initial connection is resumed.

Once the vehicle is in park, the system checks to see if any additional available devices are available for pairing (other than the device with which the vehicle is presently paired)

503. For example, the vehicle may currently be paired with a driver's device, but a passenger may also be carrying a wireless device with which the vehicle can pair.

If a secondary device is present, the vehicle associated computing system may check information that it has stored related to the second device 505 to determine if the second device is capable of completing the transfer 507. For example, the transfer may require a data plan to complete (due to an imposed constraint, for example) and the second device may or may not have a data plan associated therewith.

If the second device is capable, the system may prepare to either pause 509 or swap 511 the data transfer. The swap may, of course, also require a pause while the new connection is established. At this point, the system waits to see if an exit event (further signaling a likely loss of connection) occurs 513.

Exit events can include, but are not limited to, opening of a door, a vehicle camera detecting an occupant is no longer present, a seat sensor detecting an occupant is no longer present, etc. If an exit event is not detected, and the vehicle resumes travel, the process may exit and the transfer/pause setup may be abated.

When an exit event is detected, if a second device is present, the system checks for a second exit event 515. A second exit event may indicate that a secondary device has also left the vehicle. In this illustrative embodiment, the process assumes that a second exit event corresponds to both wireless devices leaving the vehicle, although further logic could be employed to determine whether or not the secondary device has actually left the vehicle.

If there is no second exit event, then the system will check to see if the primary signal is lost 517. If the primary signal is not lost, the system continues to check for a secondary exit event (or exits the process, for example, if the vehicle resumes travel without loss of primary signal).

If the signal is lost, the system connects to the secondary device and any data transfer in progress can be resumed by the secondary device 519.

If there was no additional device present, the transfer is prepared for pause 521. The process then waits until a signal is lost 523. If the signal is not lost, and the vehicle resumes travel, the process may terminate without pausing any data transfer that may be present.

If the signal is lost 523, the process may pause any transfers that are currently in progress, in a manner that allows the transfer to be resumed as is appropriate for a given transfer. The pause 525 may continue until an enter event is detected 527. Enter events are similar in nature to exit events, and may include, but are not limited to, a door opening, a camera detecting a passenger, a seat sensor detecting a passenger, a seat belt buckling, etc.

Once the enter event has been detected, the system begins looking for a connection availability to the originally connected device 529. Once a signal has been found, allowing reconnection to the primary device, the connection is established and any transfers (or other paused processes) may be resumed 531.

In this particular illustrative embodiment, connection is not re-established with the primary device until an enter event has been detected. This may be useful in scenarios such as a gas station scenario, where a driver may move in and out of proximity to a system, and a connection might be established and dropped repeatedly. Since, in this embodiment, the enter event triggers the reconnection, this increases the likelihood that a connection that should endure will be established as the driver has likely re-entered the vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented method comprising:
   determining if a connectable device, not currently connected to a vehicle computing system (VCS), is available for connection, once a transmission is in park;
   detecting an occupant exit-event;
   detecting a connection loss between a first connected device and the VCS; and
   conditional on the connectable device being available, once the exit-event and the connection loss have been detected, re-establishing the lost connection with the connectable device to resume the lost connection.

2. The method of claim 1, wherein the re-establishing the connection further comprises transferring control of any previously ongoing data transfer to the connectable device.

3. The method of claim 1, further comprising:
   conditional on the determination that the connectable device is not available, once the exit-event and the connection loss have been detected, pausing an ongoing data transfer;
   detecting an enter-event;
   re-connecting to the first connected device following the enter-event; and
   resuming the paused data transfer following the enter-event.

4. The method of claim 3, further comprising preparing the ongoing data transfer to be gracefully paused upon detecting that the transmission is in park.

5. The method of claim 1, further comprising:
   detecting an enter-event; and
   following the detection of an enter-event, transferring the connection from the connectable device back to the first connected device.

6. The method of claim 1, wherein the enter-event is a driver-related event.

7. A non-transitory computer-readable storage medium, storing instructions that, when executed by a vehicle-based processor, cause the processor to perform a method comprising:
   determining if a connectable device, not currently connected to a vehicle computing system (VCS), is available for connection, once a transmission is in park;
   detecting an occupant exit-event;
   detecting a connection loss between a first connected device and the VCS; and
   conditional on the connectable device being available, once the exit-event and the connection loss have been detected, re-establishing the lost connection with the connectable device to resume the lost connection.

8. The storage medium of claim 7, wherein the re-establishing the connection further comprises transferring control of any previously ongoing data transfer to the connectable device.

9. The storage medium of claim 7, wherein the method further includes:
   conditional on the determination that the connectable device is not available, once the exit-event and the connection loss have been detected, pausing an ongoing data transfer;

detecting an enter-event;
re-connecting to the first connected device following the enter-event; and
resuming the paused data transfer following the enter-event.

10. The storage medium of claim 9, wherein the method further includes preparing the ongoing data transfer to be gracefully paused upon detecting that the transmission is in park.

11. The storage medium of claim 7, wherein the method further includes:
detecting an enter-event; and
following the detection of an enter-event, transferring the connection from the connectable device back to the first connected device.

12. The storage medium of claim 7, wherein the enter-event is a driver-related event.

13. A system comprising:
a processor configured to:
determine if a connectable device, not currently connected to a vehicle computing system (VCS), is available for connection, once a transmission is in park;
detect an occupant exit-event;
detect a connection loss between a first connected device and the VCS; and
re-establishing the lost connection with the connectable device to resume the lost connection, conditional on the connectable device being available, once the exit-event and the connection loss have been detected.

14. The system of claim 13, wherein the re-establishing the connection further includes the processor being configured to transfer control of any previously ongoing data transfer to the connectable device.

15. The system of claim 13, wherein the processor is further configured to:
pause an ongoing data transfer, conditional on the determination that the connectable device is not available, once the exit-event and the connection loss have been detected;
detect an enter-event;
re-connect to the first connected device following the enter-event; and
resume the paused data transfer following the enter-event.

16. The system of claim 15, wherein the processor is further configured to prepare the ongoing data transfer to be gracefully paused upon detecting that the transmission is in park.

17. The system of claim 13, wherein the processor is further configured to:
detect an enter-event; and
transfer the connection from the connectable device back to the first connected device, following the detection of an enter-event.

18. The system of claim 13, wherein the enter-event is a driver-related event.

* * * * *